US012812310B2

(12) United States Patent
Hosoi et al.

(10) Patent No.: US 12,812,310 B2
(45) Date of Patent: Nov. 24, 2026

(54) VIBRATOR AND HEARING DEVICE

(71) Applicant: FINEWELL CO., LTD., Osaka (JP)

(72) Inventors: Hiroshi Hosoi, Osaka (JP); Tsukasa Okabe, Yamagata (JP); Takeshi Kono, Osaka (JP)

(73) Assignee: FINEWELL CO., LTD., Osaka (JP)

( * ) Notice: Subject to any disclaimer, the term of this patent is extended or adjusted under 35 U.S.C. 154(b) by 161 days.

(21) Appl. No.: 18/400,158

(22) Filed: Dec. 29, 2023

(65) Prior Publication Data

US 2024/0334140 A1 Oct. 3, 2024

(30) Foreign Application Priority Data

Mar. 30, 2023 (JP) ................................ 2023-054931

(51) Int. Cl.
*H04R 25/00* (2006.01)
*H04R 9/02* (2006.01)
*H04R 9/04* (2006.01)

(52) U.S. Cl.
CPC ........... *H04R 25/606* (2013.01); *H04R 9/025* (2013.01); *H04R 9/045* (2013.01); *H04R 25/65* (2013.01)

(58) Field of Classification Search
CPC .. H04R 25/606; H04R 9/025; H04R 2400/03; H04R 9/045
USPC ................................ 381/351, 191, 396, 412
See application file for complete search history.

(56) References Cited

U.S. PATENT DOCUMENTS 5,390,257 A * 2/1995 Oslac ...................... H04R 9/06 381/414
2003/0081000 A1 5/2003 Watanabe et al.
2006/0165249 A1 7/2006 Sato
2006/0226714 A1 10/2006 Miura
2014/0153755 A1* 6/2014 Hug ....................... G06F 30/00 703/1
2022/0394392 A1 12/2022 Nakatani et al.

FOREIGN PATENT DOCUMENTS

CN 209805645 U 12/2019
CN 114071334 A 2/2022
CN 216313372 U 4/2022
JP 2003-150542 A 5/2003
JP 2006-203709 A 8/2006
JP 2015-186102 A 10/2015
JP 2016-116177 A 6/2016
JP 2018-117203 A 7/2018
JP 6618230 B1 12/2019
WO 2004/006620 A1 1/2004
WO 2009/133986 A1 11/2009
WO 2023/053958 A1 4/2023

OTHER PUBLICATIONS

Office Action issued in corresponding Taiwanese Application No. 112151074, mailed Dec. 17, 2024 (12 pages).
International Search Report issued in related International Application No. PCT/JP2022/034333 mailed Dec. 6, 2022 (4 pages).

* cited by examiner

*Primary Examiner* — George C Monikang

(74) *Attorney, Agent, or Firm* — Osha Bergman Watanabe & Burton LLP

(57) ABSTRACT

A vibrator includes a case having a space inside, and a magnet supported in the space so as to be configured to vibrate. The magnet includes a first magnet and a second magnet disposed in such a manner that respective magnetic poles identical to each other face. The volume of the first magnet is smaller than the volume of the second magnet.

10 Claims, 10 Drawing Sheets

VIBRATOR AND HEARING DEVICE

CROSS-REFERENCE TO RELATED APPLICATION

The present application claims priority from Japanese Application JP2023-054931, the content of which is hereby incorporated by reference into this application.

BACKGROUND OF THE INVENTION

1. Field of the Invention

The present disclosure relates to a vibrator and a hearing device.

2. Description of the Related Art

Various devices have been conventionally proposed that convey vibrations to a target object to thus allow the target object to perceive sound; examples of such devices include bone conduction devices, bone conduction loudspeakers, and bone conduction vibrators. See, for instance, Japanese Unexamined Patent Application Publication No. 2003-150542, Japanese Patent No. 6618230, Japanese Unexamined Patent Application Publication No. 2015-186102, Japanese Unexamined Patent Application Publication No. 2016-116177, and Japanese Unexamined Patent Application Publication No. 2018-117203.

SUMMARY OF THE INVENTION

However, these devices have many problems that need to be further studied.

One aspect of the present disclosure aims to provide a more useful vibrator and a more useful hearing device.

A vibrator according to one aspect of the present disclosure includes the following: a case having a space inside; and a magnet supported in the space so as to be configured to vibrate. The magnet includes a first magnet and a second magnet disposed in such a manner that respective magnetic poles identical to each other face. The volume of the first magnet is smaller than the volume of the second magnet.

The volume ratio of the second magnet to the first magnet is greater than 1 and equal to or smaller than 121.

The surface magnetic flux ratio of the second magnet to the first magnet is greater than 1 and equal to or smaller than 3.

The first magnet and the second magnet are fastened to both of the surfaces of a top plate composed of a ferromagnet.

The vibrator includes the following: a yoke being open at the upper end of the yoke, and having a bottom surface portion and a circumferential wall portion; a coil bobbin at least partly disposed inside the yoke; a coil wound around the coil bobbin; a damper supporting the yoke; and a frame fastening the damper to the yoke. At least a part of the magnet is disposed inside the coil bobbin. The case houses an assembly on which the yoke, the coil bobbin, the coil, the magnet, the damper, and the frame are mounted. The assembly vibrates in the space integrally together with the magnet.

The inner surface of the case surrounding the space includes a facing portion closely facing the yoke.

A hearing device according to one aspect of the present disclosure has the vibrator as a cartilage conduction vibrator for transmitting a sound signal to an ear cartilage.

DETAILED DESCRIPTION OF THE INVENTION

Overall Structure of Vibrator

Figure 1:
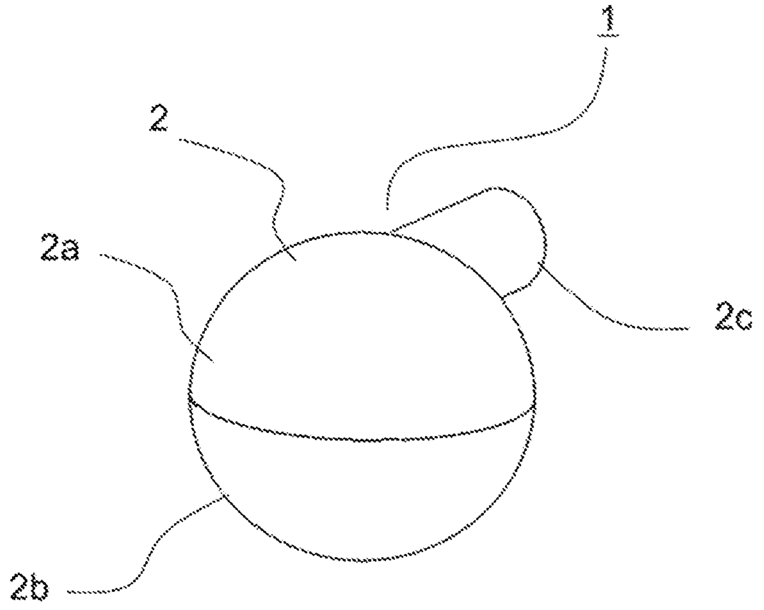
FIG. 1 is a perspective view of a vibrator of a hearing device according to a preferred embodiment.
Figure 2:
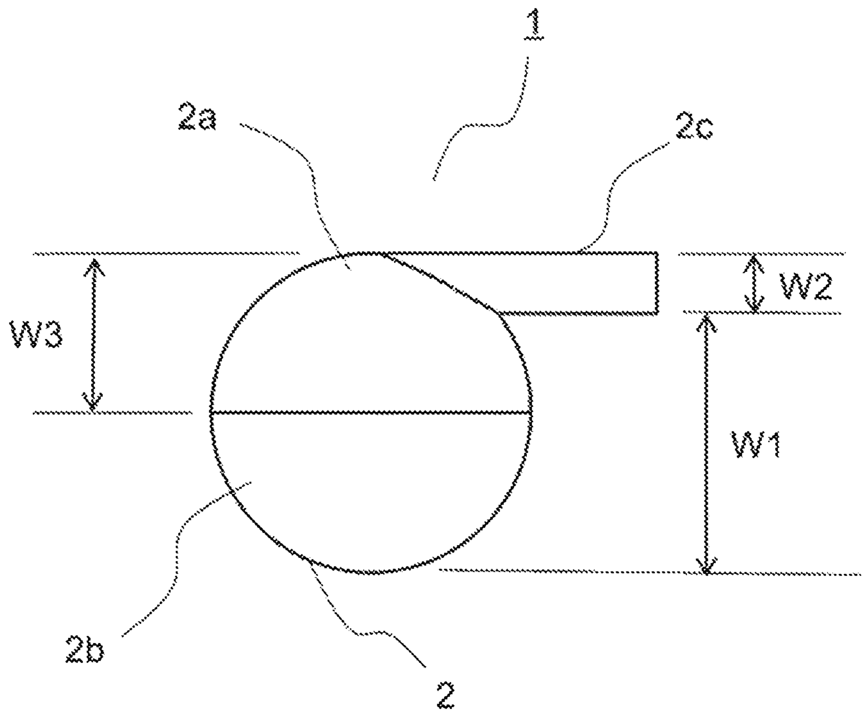
FIG. 2 is a side view of the vibrator of the hearing device according to the preferred embodiment.
Figure 3:
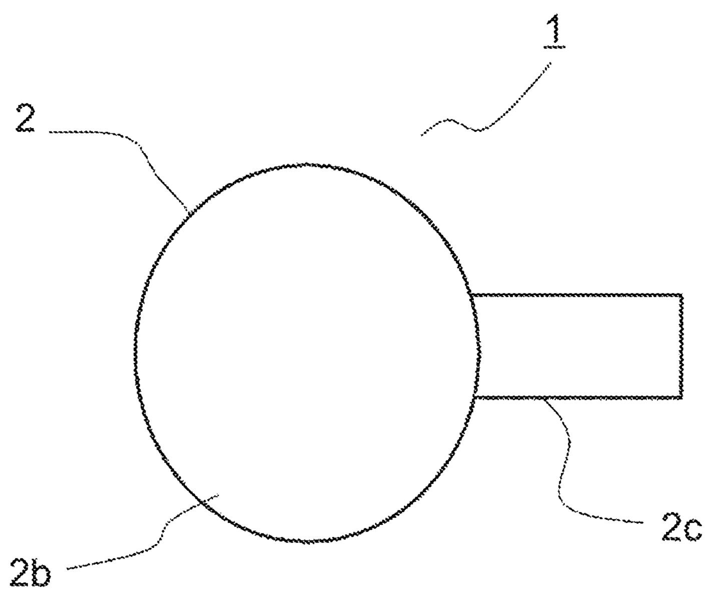
FIG. 3 is a bottom view of the vibrator of the hearing device according to the preferred embodiment.
Figure 4:
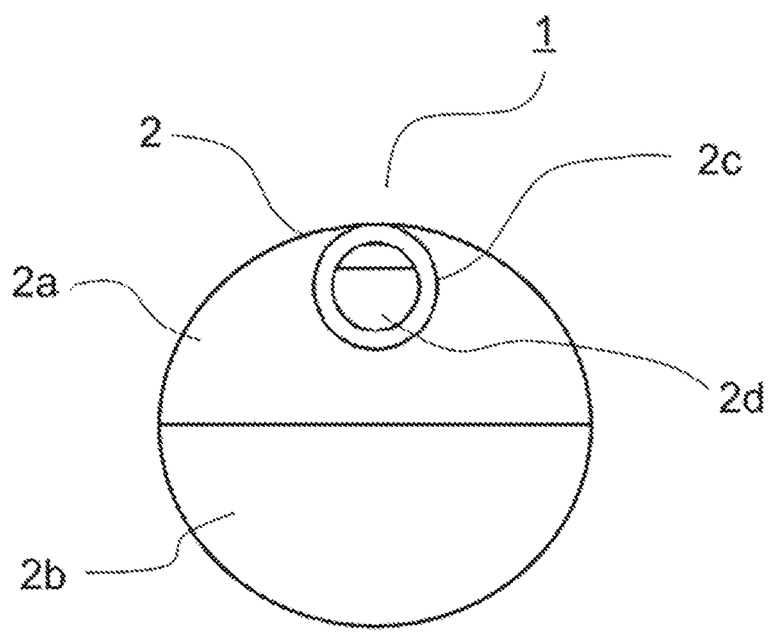
FIG. 4 is a back view of the vibrator of the hearing device according to the preferred embodiment.

FIG. 1 is a perspective view of a vibrator 1 of a hearing device according to a preferred embodiment. FIG. 2 is a side view of the vibrator 1 of the hearing device according to the preferred embodiment. FIG. 3 is a bottom view of the vibrator 1 of the hearing device according to the preferred embodiment. FIG. 4 is a back view of the vibrator 1 of the hearing device according to the preferred embodiment.

The vibrator 1 has a case 2 composed of an upper case 2*a* and a lower case 2*b*. The upper case 2*a* and the lower case 2*b* are fastened to each other with an adhesive or other things. The upper case 2*a* has a protrusion 2*c*. The case 2 has a space inside. The case 2 is made of a resin (e.g., an ABS resin) or other things. The case 2 in this preferred embodiment has an outer diameter of about 12.0 to 13.00 mm.

Figure 8:
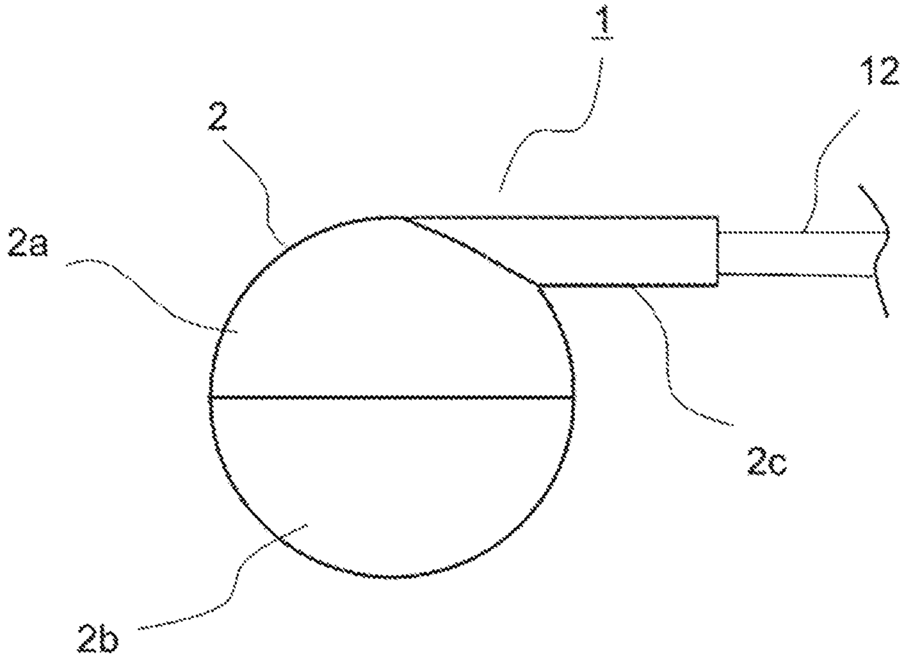
FIG. 8 is a side view of the vibrator of the hearing device according to the preferred embodiment with a cable connected to the vibrator.

The protrusion 2*c* of the upper case 2*a* has a wiring hole 2*d* for passing a cable 12 therethrough. FIG. 8 is a side view of the vibrator 1 of the hearing device according to the preferred embodiment with the cable 12 connected to the vibrator 1.

The surface of the case 2 excluding the protrusion 2*c* is a curved surface. In line with the illustration, the case 2 excluding the protrusion 2*c* has a spherical shape, or a shape close to a spherical shape. A "spherical shape" includes not only a perfectly spherical shape, but also a substantially spherical shape within a certain error range. When the vibrator 1 is put on a user's ear, a portion denoted by an interval W1, measured from the lower end of the case 2 to the protrusion 2*c*, is hooked over the ear. The interval W1 is preferably large so that the vibrator 1 is put on the ear stably. For instance, an interval W2 in the up-and-down direction of the protrusion 2*c* is conceivably set at a half or less of an interval W3, measured from the lower end of the upper case 2*a* to the upper end of the same. Further, the protrusion 2*c* preferably extends in, for instance, the tangential direction of the upper case 2*a*.

Figure 5:
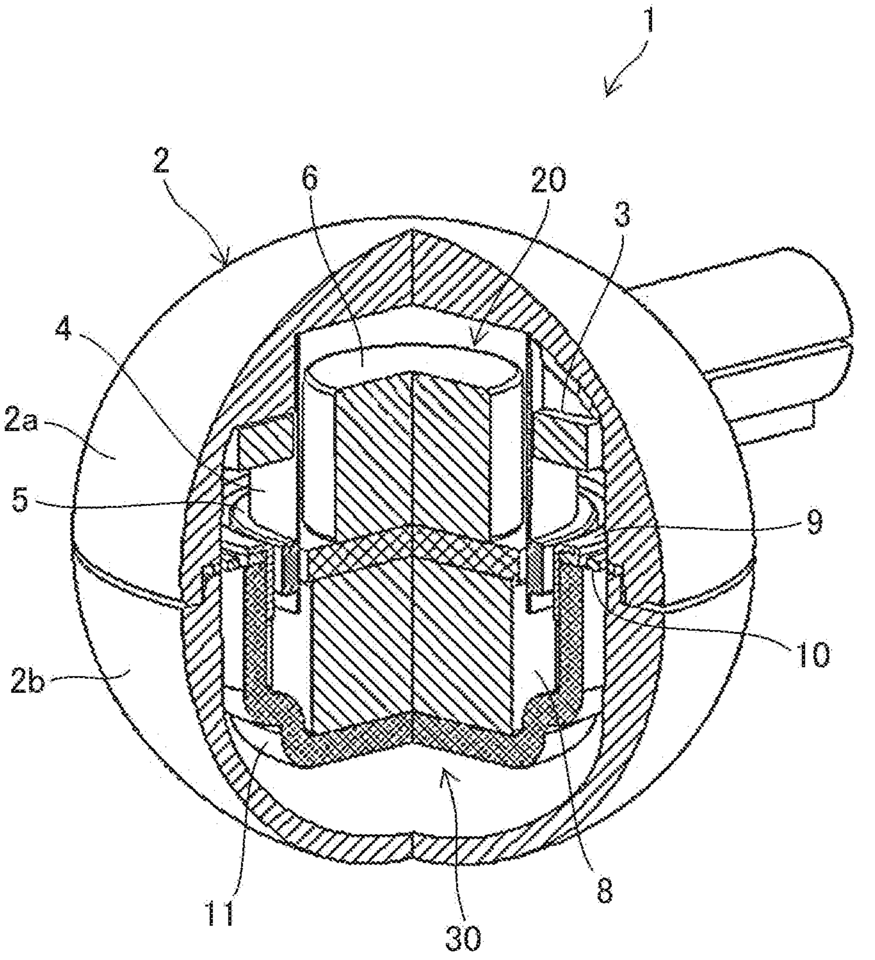
FIG. 5 illustrates the inner structure of the vibrator of the hearing device according to the preferred embodiment.
Figure 6:
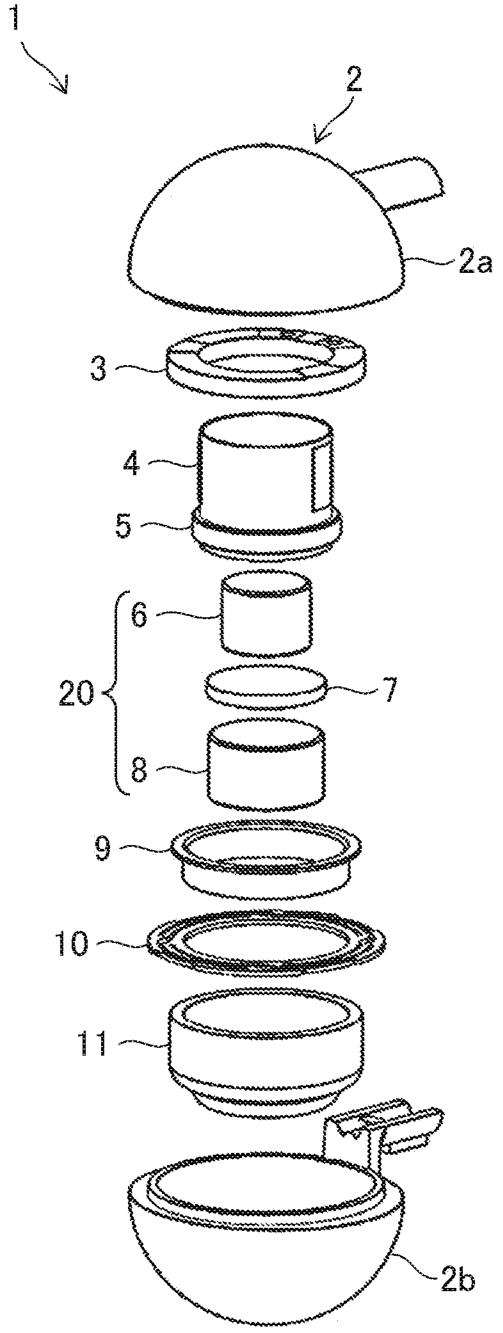
FIG. 6 is an exploded perspective view of the vibrator of the hearing device according to the preferred embodiment.

FIG. 5 illustrates the inner structure of the vibrator 1 of the hearing device according to the preferred embodiment (a partial sectional view of the vibrator 1 with a part of the same cut). FIG. 6 is an exploded perspective view of the vibrator 1 of the hearing device according to the preferred embodiment.

The following components are housed in the space within the case 2: a coil bobbin 4, a coil 5, a magnet 20 (a first magnet 6 and a second magnet 8), a top plate 7, a frame 9, a damper 10, a yoke 11, and a substrate 3. The case 2 in this preferred embodiment houses, as described later on, an assembly 30 on which the coil bobbin 4, the coil 5, the magnet 20, the frame 9, the damper 10, and the yoke 11 are mounted.

The coil 5 is wound around the coil bobbin 4. The coil bobbin 4 is long longitudinally and has an upper end abutting on the inner surface of the case 2 (upper case 2*a*). The coil 5 receives an electric signal (e.g., a sound signal). The coil bobbin 4 is formed of kraft paper or other things, and the coil 5 is made of copper or other things.

Further, the substrate 3 is attached to the inner surface of the case 2 (upper case 2*a*). The substrate 3 is connected to the cable 12 (see FIG. 8) and is also connected to the distal end (not shown) of the coil 5, or a wire (not shown) connected to the coil 5.

Since the substrate 3 is close to the wiring hole 2*d*, the cable 12 can be connected to the substrate 3 easily. Further, since the coil bobbin 4 is long longitudinally so that its upper end abuts on the substrate 3 and the inner surface of the case 2 (upper case 2*a*), the distal end (not shown) of the coil 5, or the wire (not shown) connected to the coil 5 can be connected to the substrate 3 easily. The coil bobbin 4 in this preferred embodiment has a surface with copper foil attached thereto, and with a wire, which is connected to the substrate 3, soldered (bridge-connected) thereto.

The magnet 20 is supported in the space within the case 2 so as to be configured to vibrate. The magnet 20 is at least partly disposed inside the coil bobbin 4. The magnet 20 includes the first magnet 6 and the second magnet 8 disposed in such a manner that respective magnetic poles identical to each other face. The first magnet 6 and the second magnet 8 are neodymium magnets for instance. The first magnet 6 and second magnet 8 in this preferred embodiment are formed to have the same quality and made of the same material, and they are formed in a columnar shape with its central axis extending up and down. The first magnet 6 and the second magnet 8 are arranged up and down so that their axes are coincident with each other. The detailed structure of the magnet 20 will be described later on.

The top plate 7 is disposed inside the coil bobbin 4. The first magnet 6 and the second magnet 8 are fastened to both of the surfaces of the top plate 7, which is composed of a ferromagnet. In this preferred embodiment, the lower end surface of the first magnet 6 is fastened to the upper surface of the top plate 7 with an adhesive. The upper end surface of the second magnet 8 is fastened to the lower surface of the top plate 7 with an adhesive. The top plate 7 is made of, for instance, iron (e.g., SPCC) that constitutes a ferromagnet. It is noted that the first magnet 6 and the second magnet 8 may be fastened with an adhesive or other things so as to be in direct contact with each other without the top plate 7 interposed therebetween.

The yoke 11 is open at its upper end and has a bottom surface portion and a circumferential wall portion. The shape of the lower part of the inside of the yoke 11 corresponds to the shape of the lower end of the second magnet 8 so that the lower end of the second magnet 8 is fastened inside the yoke 11. This facilitates the positioning of the second magnet 8. The yoke 11 is made of a soft magnetic material (e.g., SPCC).

At least a part of the coil bobbin 4 is disposed inside the yoke 11. In this preferred embodiment, the lower part of the coil bobbin 4 is disposed inside the yoke 11.

The damper 10 supports the yoke 11. The frame 9 fastens the damper 10 to the yoke 11. In this preferred embodiment, the outer edge portion of the damper 10 is sandwiched up and down between the upper case 2*a* and the lower case 2*b*, so that the damper 10 is fastened to the case 2. That is, the outer edge portion of the damper 10 is sandwiched and supported between the upper case 2*a* and the lower case 2*b*. The inner edge portion of the damper 10 has a lower surface abutting on the upper end of the circumferential wall portion of the yoke 11. The damper 10 is made of stainless steel for instance.

The frame 9 is fastened to the damper 10 and the yoke 11 so as to abut on the upper surface of the inner edge portion of the damper 10, and on the inner surface of the circumferential wall portion of the yoke 11. The frame 9, although fastened to the damper 10 and yoke 11 with an adhesive in this preferred embodiment, may be fastened through a technique, such as swaging fastening. The frame 9 is made of a soft magnetic material (e.g., steel plate cold commercial or SPCC for short). In this way, fastening the damper 10 to the yoke 11 by the use of the frame 9 facilitates fastening the damper 10 and yoke 11 together and is thus suitable for producing the vibrator 1 in volume.

In this way, the frame 9 fastens the damper 10 to the yoke 11, and thus, the damper 10 supports the yoke 11. The yoke 11 is hung in midair inside the case 2 by the damper 10 and frame 9. That is, the yoke 11 is away from the inner surface of the case 2.

With the foregoing configuration, the assembly 30 on which the coil bobbin 4, the coil 5, the magnet 20, the frame 9, the damper 10, and the yoke 11 are mounted is disposed in the space within the case 2. The assembly 30 (see FIG. 9) is supported in the space within the case 2 by the elastic damper 10, coupling the case 2 and yoke 11 together, so as to be able to change position up and down. The assembly 30 vibrates in the space within the case 2 integrally together with the magnet 20 on the following principles.

Upon receiving an electric signal (e.g., a sound signal), the coil 5 generates a magnetic field, and this magnetic field causes the magnet 20 disposed within the coil bobbin 4 to vibrate. The yoke 11, to which the magnet 20 is fastened, vibrates as well in conjunction with the vibration of the magnet 20. The damper 10, supporting the yoke 11, vibrates in conjunction with the vibration of the yoke 11, and the case 2 thus vibrates. When the case 2 abuts the user, the vibration of the case 2 propagates to the user, and the user thus perceives sound.

Fastening the yoke to the case's inner surface with an adhesive or other things may possibly involve a problem where vibration cannot be perceived throughout the band, and where only a high frequency band (e.g., 5 kHz or greater) can be heard. This preferred embodiment can reduce the possibility of such a problem because the yoke 11 is away from the inner surface of the case 2.

Further, the frame 9 and the circumferential wall portion of the yoke 11 at least partly face the coil 5. This configuration facilitates collecting magnetic flux to the coil 5. In particular, the frame 9 and the yoke 11 that are made of a soft magnetic material (e.g., SPCC) facilitate collecting magnetic flux to the coil 5. When magnetic flux concentrates (magnetic flux density becomes high), driving force for vibration increases, easily producing vibration.

It is noted that for a case provided with a hole, sound leaks from the case hole when the vibrator vibrates. A possible way to avoid sound leakage is enclosing the case when such avoidance is preferable. Accordingly, the case 2 may be enclosed. For enclosing the case 2, a stoppage component (not shown) for stop up the wiring hole 2*d* may be used.

However, if the case is enclosed, and a vibration plate (e.g., a damper) within the case is formed into a hole-free shape, vibration is less likely to occur. For a small case in particular, the vibration plate is less likely to move due to the air pressure within the case. Further, the space within the case is separated into an upper space and a lower space by the vibration plate. The air within the lower space cannot move to the upper space even though, for instance, the vibration plate tries to move down. Hence, the vibration plate cannot vibrate, or the vibration width of the vibration plate is reduced.

Figure 7:
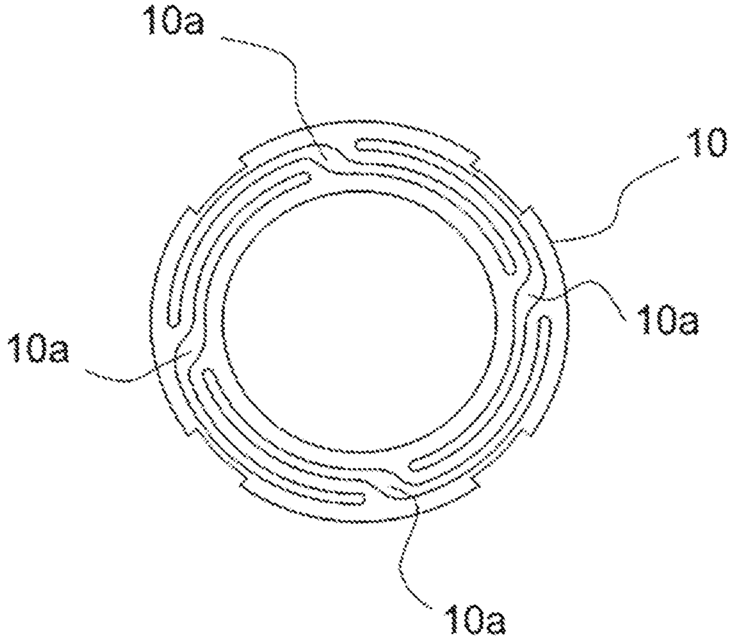
FIG. 7 is a plan view of a damper according to the preferred embodiment.

FIG. 7 is a plan view of the damper 10 according to the preferred embodiment. The damper 10 is provided with a through-hole 10*a* penetrating longitudinally. The air on the upper side of the damper 10 can move under the damper 10 by way of the through-hole 10*a*. Further, the air on the lower side of the damper 10 can move over the damper 10 by way of the through-hole 10*a*. The air movement within the case 2 is non-limiting. The damper 10 can vibrate greatly not only in a case where the case 2 is unenclosed, but also in a case where the inside of the case 2 is an enclosed space. The damper 10 can thus vibrate greatly even in a case where the case 2 is small and enclosed.

Since the damper 10 can vibrate greatly not only in a case where the case 2 is unenclosed, but also in a case where the case 2 is enclosed, the case 2 can vibrate sufficiently. This allows sufficient vibration to propagate to the user of the vibrator 1.

By the way, such case's vibration as described above causes the air around the case to vibrate, possibly producing air-conducted sound. In this preferred embodiment, the case 2, which has a small surface area, can prevent air-conducted sound. This can prevent air-conducted sound from leaking around the user while allowing vibration to propagate to the user.

Water or sweat does not enter the case 2 that is enclosed. The use of an enclosed case is applicable to a waterproof vibrator.

The damper 10 may be made of liquid metal. The damper 10 can possibly break due to repeated vibration. Liquid metal is elastic and insusceptible to fatigue breakage though it is a metal. The damper 10 that is made of liquid metal can be used for a long time.

In this preferred embodiment, the damper 10 is disposed in the middle in the up-and-down direction of the case 2. The case 2 can be formed into a spherical shape, or a shape close to a spherical shape without increasing the size of the case 2. It is noted that a "middle" includes not only an exact middle, but also a substantial middle within a certain error range.

The vibrator 1 may be used as a cartilage conduction vibrator. It is thus preferable that the hearing device in the present invention have the foregoing vibrator 1 as a cartilage conduction vibrator for transmitting a sound signal to an ear cartilage.

Detailed Structure of Magnet

Figure 9:
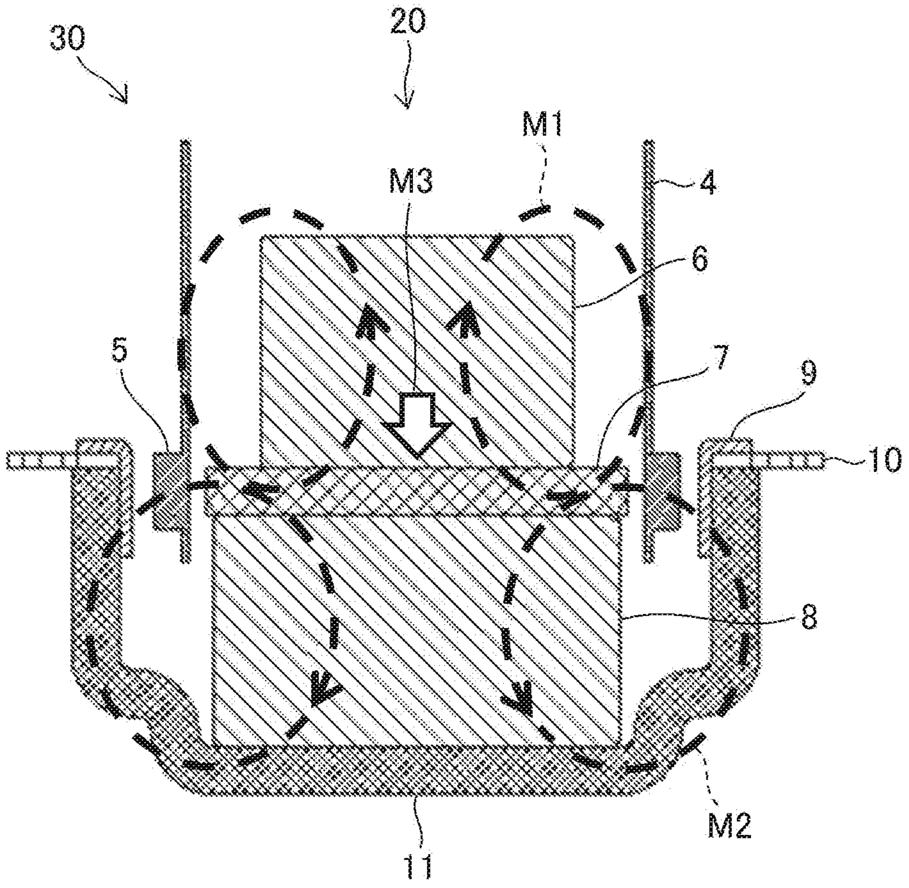
FIG. 9 is a longitudinal sectional view of an assembly according to the preferred embodiment.

FIG. 9 is a longitudinal sectional view of the assembly 30 according to the preferred embodiment. As earlier described, the driving force for causing the magnet 20 to vibrate increases along with increase in the magnetic flux density of the coil 5. In the vibrator 1 according to this preferred embodiment, to concentrate magnetic flux on the coil 5, the outer diameter of the top plate 7 is set to be larger than the outer diameter of the magnet 20, so that a flow of a magnetic field is formed that allows magnetic flux to easily concentrate on the coil 5. Furthermore, to further strengthen the magnetic flux of the coil 5, the magnet 20 is composed of two magnets (the first magnet 6 and the second magnet 8) with their respective poles identical to each other facing.

If two magnets were disposed in such a manner that their respective poles identical to each other do not face, their respective magnetic poles different from each other would face, and hence, the magnetic field of the coil 5 would act in directions that cancel out each other, weakening the magnetic flux of the coil 5 in some cases. Furthermore, the magnetic flux of the coil 5 becomes weak more easily in two magnets with their respective poles identical to each other not facing, than in a case where only one of the two magnets is used. In this preferred embodiment by contrast to this, the magnet 20, which is composed of two magnets with their respective poles identical to each other facing, can improve the magnetic flux density of the coil 5 efficiently.

On the other hand, when two magnets with their respective poles identical to each other facing are used, at least one of the two magnets can be possibly come off from the top plate by their repelling force. In detail, a first magnet, which is one of the two magnets, is not fastened to the yoke and is within the coil bobbin, and the first magnet is thus difficult to fasten. Accordingly, the first magnet can be possibly come off from the top plate by the foregoing repelling force.

The repelling force between the first magnet 6 and second magnet 8 increases along with increase in the surface magnetic flux densities of the first magnet 6 and second magnet 8. When the first magnet 6 and the second magnet 8 are of the same quality and are made of the same material, the surface magnetic flux densities of the first magnet 6 and second magnet 8 increase along with increase in the volumes of the first magnet 6 and second magnet 8.

In this preferred embodiment, the volume of the first magnet 6 is smaller than the volume of the second magnet 8. The surface magnetic flux density of the first magnet 6 is thus smaller than the surface magnetic flux density of the second magnet 8, and hence, the repelling force between the first magnet 6 and second magnet 8 is small. Accordingly, in the magnet 20, the first magnet 6 is prevented from being come off from the top plate 7 by the foregoing repelling force.

The inventors run a test to examine effect that is exerted on the acoustic property of the vibrator 1 by the foregoing configuration. In this test, the inventors caused the vibrator 1 to output a sweep sound in the frequency band (several tens of hertz to twenty thousand hertz) of an audible range and measured its sound pressure level using a ½-inch condenser microphone. The inventors run the test multiple times while changing only the outer diameter of the first magnet 6 with the other measurement conditions remaining the same. It is noted that the heights (longitudinal lengths) of the first magnet 6 and second magnet 8 are equal to each other and measure, for instance, about 2.0 mm. The applied voltage of the electric signal of the sweep sound is 2.0 V, and the thickness (longitudinal length) of the damper 10 measures 0.2 mm.

Figure 10A:
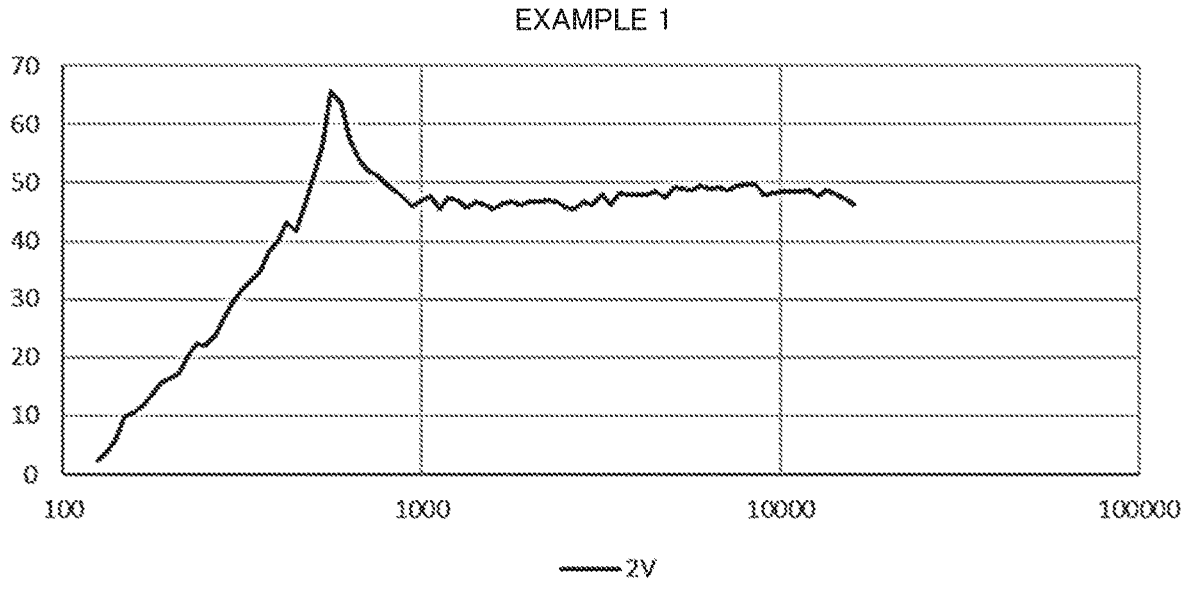
FIG. 10A illustrates example actual measurement data based on the vibrator of a hearing device according to Example 1.

FIG. 10A illustrates example actual measurement data based on the vibrator 1 of a hearing device according to Example 1. The longitudinal axis in this graph of the actual measurement data denotes sound pressure (dBSPL), and the lateral axis in the same denotes frequency (Hz) in a logarithmic scale. In the vibrator 1 in Example 1, the first magnet 6 has an outer diameter of 4.0 mm, and the second magnet 8 has an outer diameter of 5.2 mm. In this case, the volume ratio between the first magnet 6 and second magnet 8 is 1:1.69.

As shown in FIG. 10A, the vibrator 1 in Example 1 achieves a favorable sound pressure of about 45 dB or greater in the main frequency band (500 to 2300 Hz) of the sound. A sound pressure necessary to transmit the vibration of the vibrator 1 to an ear cartilage is obtained with certainty when, for instance, the vibrator 1 is brought into contact with at least a part of the ear cartilage around the entrance of the ear canal. That is, it has been confirmed that the vibrator 1 in Example 1 can function sufficiently as a cartilage conduction vibrator. Accordingly, this cartilage conduction mechanism discovered by the inventors allows humans to hear sound from the vibrator 1 without blocking their ear canals, and at the same time, to hear sound from the outside world.

Figure 11:
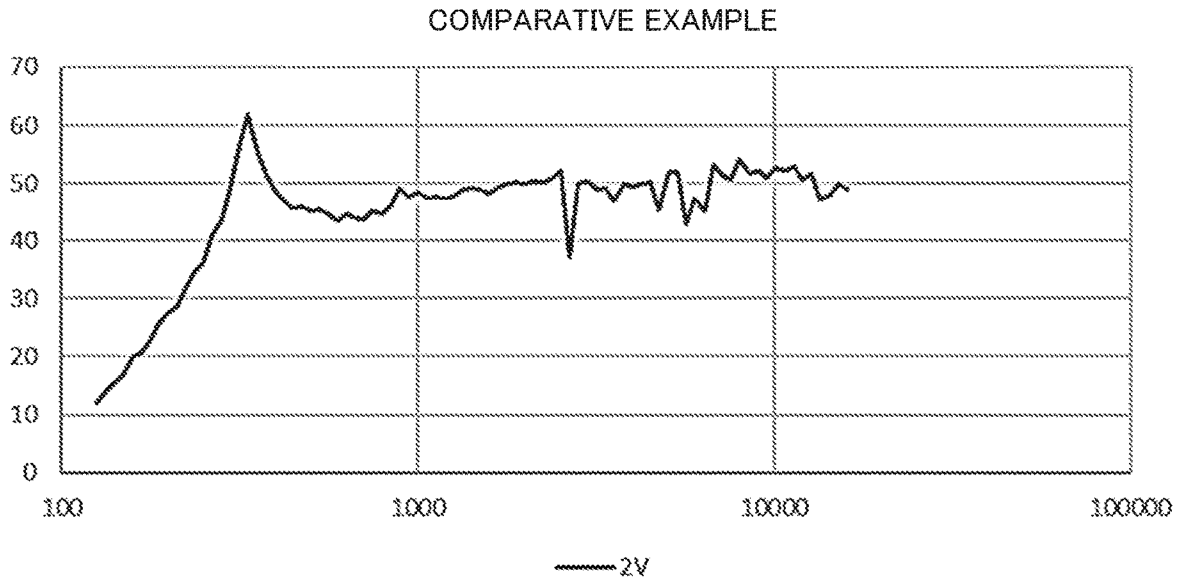
FIG. 11 illustrates example actual measurement data based on a vibrator of a hearing device according to a comparative example.

FIG. 11 illustrates example actual measurement data based on a vibrator of a hearing device according to a comparative example. Like a conventional vibrator, the vibrator in the comparative example is structured such that its first magnet and second magnet have an equal outer diameter, which measures 5.2 mm. Thus, the volume ratio between the first magnet and second magnet is an equal value, which is 1:1.

As shown in FIG. 11, the vibrator in the comparative example achieves a favorable sound pressure of about 45 dB or greater in the main frequency band (500 to 2300 Hz) of the sound, like the vibrator 1 in Example 1 (see FIG. 10A). However, the vibrator in the comparative example, which includes the first magnet and second magnet having an equal volumetric capacity, has the possibility that, as earlier described, the first magnet is come off from the top plate by the repelling force. In contrast to this, the vibrator 1 in Example 1 can output sound of quality equivalent to that in the vibrator in the comparative example while preventing the first magnet 6 from coming off from the top plate 7.

Figure 10B:
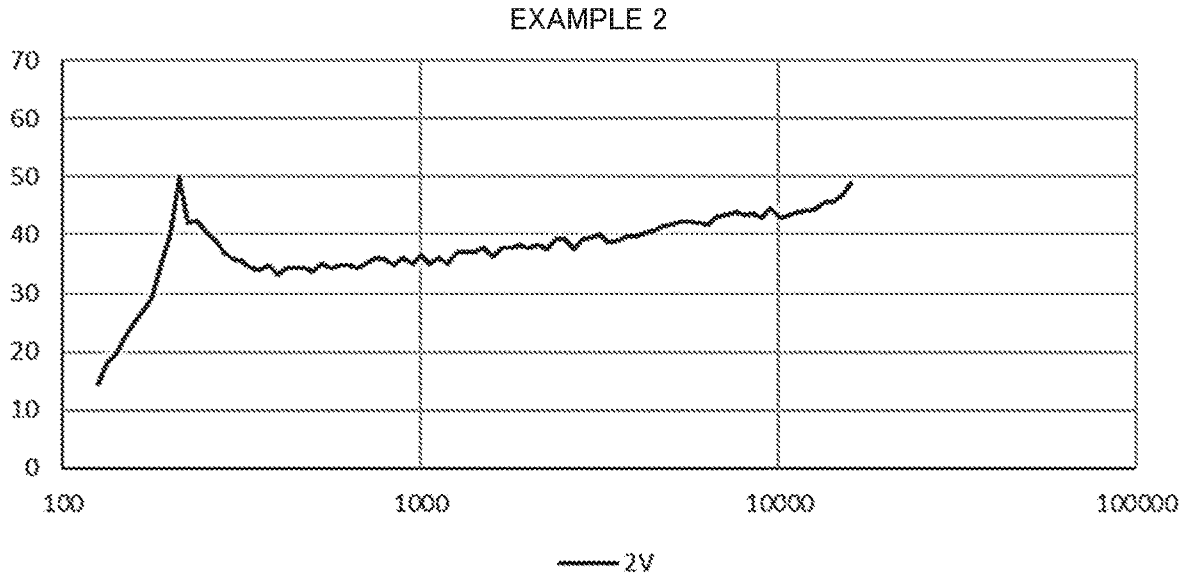
FIG. 10B illustrates example actual measurement data based on the vibrator of a hearing device according to Example 2.

FIG. 10B illustrates example actual measurement data based on the vibrator 1 of a hearing device according to Example 2. Like the vibrator 1 in Example 1, the vibrator 1 in Example 2 is structured such that the outer diameter of the first magnet 6 is smaller than the outer diameter of the second magnet 8. In the vibrator 1 in Example 2, the first magnet 6 has an outer diameter of 1.0 mm, and the second magnet 8 has an outer diameter of 5.2 mm. In this case, the volume ratio between the first magnet 6 and second magnet 8 is 1:27. That is, the vibrator 1 in Example 2 has a smaller volume than that in Example 1.

As shown in FIG. 10B, the vibrator 1 in Example 2 offers sound quality of about 35 to 45 dB in the main frequency band (500 to 2300 Hz) of the sound. Thus, it has been confirmed that the vibrator 1 in Example 2 can function effectively as a cartilage conduction vibrator though having lower sound quality than the vibrator 1 in Example 1.

The plurality of vibrators 1 used in Examples 1 and 2 have their outer diameters different from each other, and thus, their volumes are different from each other. However, the plurality of vibrators 1 may be structured such that their respective volumes are different from each other by having mutually different combinations of outer diameter and height. The inventors run a test similar to the foregoing, on a plurality of vibrators 1 with their combinations of outer diameter and height being different from each other. Accordingly, it has been confirmed that the vibrator 1 can function effectively as a cartilage conduction vibrator when each component constituting the vibrator 1 had the following dimension and property.

The first magnet 6 has an outer diameter of 1.0 to 5.5 mm, and a height of 1.0 to 4.0 mm. For a minimum size (1.0 mm in outer diameter, and 1.0 mm in height) satisfying this condition, the volume of the first magnet 6 is 0.78 $mm^3$, and the surface magnetic flux density of the same at this time is 150 mT. For a maximum size (5.5 mm in outer diameter, and 4.0 mm in height) satisfying this condition, the volume of the first magnet 6 is 95 $mm^3$, and the surface magnetic flux density of the same at this time is 450 mT.

The first magnet 8 has an outer diameter of 3.0 to 5.5 mm, and a height of 1.0 to 4.0 mm. For a minimum size (3.0 mm in outer diameter, and 1.0 mm in height) satisfying this condition, the volume of the second magnet 8 is 7.06 $mm^3$, and the surface magnetic flux density of the same at this time is 230 mT. For a maximum size (5.5 mm in outer diameter, and 4.0 mm in height) satisfying this condition, the volume of the second magnet 8 is 95 $mm^3$, and the surface magnetic flux density of the same at this time is 450 mT.

Thus, the first magnet 6 has a volume of 0.78 to 95 $mm^3$, and a surface magnetic flux density of 150 to 450 mT. The second magnet 8 has a volume of 7.06 to 95 $mm^3$, and a surface magnetic flux density of 230 to 450 mT. Note that the volume of the first magnet 6 is smaller than the volume of the second magnet 8, as earlier described. Thus, the volume of the first magnet 6 is less than 95 $mm^3$, and the surface magnetic flux density of the first magnet 6 is less than 450 mT.

Based on the foregoing volumes of the first magnet 6 and second magnet 8, the volume ratio of the second magnet 8 to the first magnet 6 is greater than 1 and equal to or smaller than 121. Further, based on the foregoing surface magnetic flux densities of the first magnet 6 and second magnet 8, the surface magnetic flux ratio of the second magnet 8 to the first magnet 6 is greater than 1 and equal to or smaller than 3.

As earlier described, conceivable aspects for making the volume of the first magnet 6 smaller than the volume of the second magnet 8 are an aspect of reducing only the outer diameter of the first magnet 6, and an aspect of reducing both of the outer diameter and height of the first magnet 6. The former aspect enables the surface magnetic flux density of the first magnet 6 to be relatively high, thereby obtaining a relatively high magnetic flux density in the coil 5. The latter aspect enables the volume of the first magnet 6 to be efficiently reduced, thereby preventing the first magnet 6 from coming off from the top plate 7 with more certainty.

Furthermore, the following action is obtained by placing the first magnet 6 and the second magnet 8 so as to be coaxially arranged, and by setting the outer diameter of the first magnet 6 to be smaller than the outer diameter the second magnet 8. As illustrated in FIG. 9, the first magnet 6 generates a magnetic field M1 that rotates in the circumferential direction of the coil 5. The second magnet 8 generates a magnetic field M2 that rotates in the circumferential direction of the coil 5. The magnetic field M1 and the magnetic field M2 rotate in mutually opposite directions.

In the top plate 7 in this case, the magnetic field M1 and the magnetic field M2 are less likely to interfere with each other, because the magnetic field M1 occurs inside the magnetic field M2 in a plan view. The first magnet 6 easily self-adsorbs to the top plate 7 by the action of the magnetic field M1 (see Arrow M3), because the effect of the magnetic field M2 is small near the center of the top plate 7. The self-adsorption of the first magnet 6 can further prevent the first magnet 6 from coming off from the top plate 7.

Self-adsorption is a phenomenon where the first magnet 6 adheres to the top plate 7 with a weaker force than that in bonding even when the first magnet 6 and the second magnet 8 act in mutually repelling directions. The inventors have confirmed that the self-adsorption of the first magnet 6 suitably occurs in the vibrator 1 in Example 1 (i.e., the outer diameter of first magnet 6 measures 4.0 mm, and the height of the same measures 2.0 mm).

Dimensions and Properties of Other Components

On the basis of various experiments, the inventors have identified that the main factors that considerably affects the acoustic property of the vibrator 1 are the surface magnetic flux density of the magnet 20, the thickness of the damper 10, and the weight of the yoke 11.

When the damper 10 is too thin for instance, a sound signal transforms into a mere vibration in the damper 10 upon the frequency of the sound signal reaching a certain level, thus possibly failing to properly transmit the sound signal to the case 2. When the damper 10 is too thick on the other hand, the damper 10 is difficult to vibrate, thus possibly failing to properly transmit the sound signal to the case 2. In view of them, the thickness of the damper 10 needs to be designed within a proper range. The thickness of the damper 10 also needs to be designed in accordance with the weights of the yoke 11 and magnet 20.

Figure 10C:
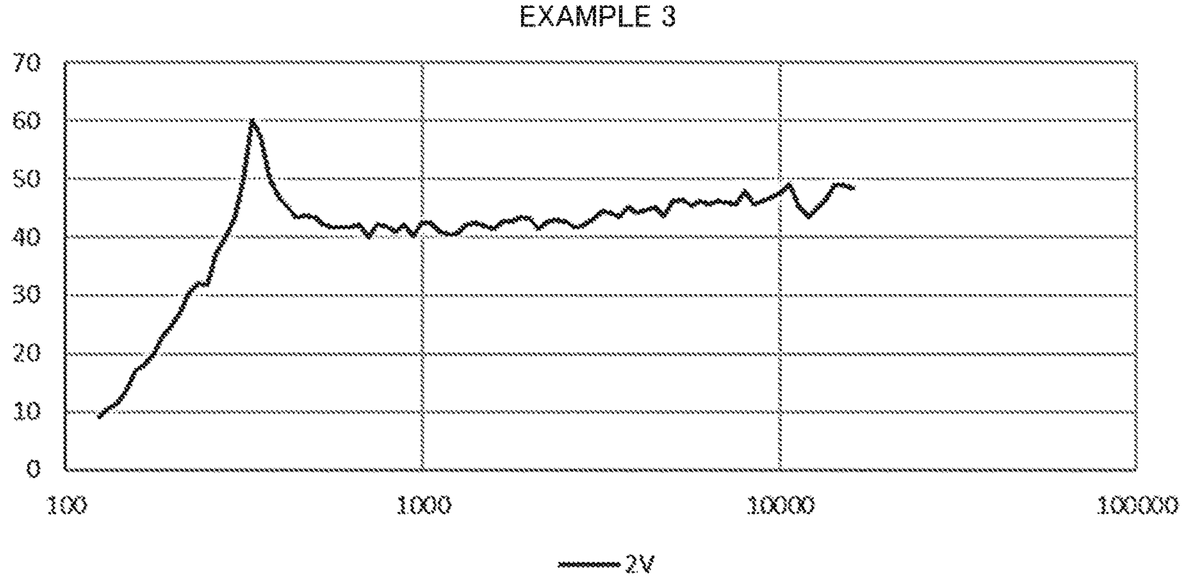
FIG. 10C illustrates example actual measurement data based on the vibrator of a hearing device according to Example 3.

FIG. 10C illustrates example actual measurement data based on the vibrator 1 of a hearing device according to Example 3. The damper 10 of the vibrator 1 in Example 3 is 0.15 mm thick. That is, the damper 10 in Example 3 is thinner than that in Example 1. The other conditions of the damper 10 except the thickness are the same as those in Example 1.

As shown in FIG. 10C, the vibrator 1 in Example 3 achieves a sound pressure of about 40 dB or greater though the sound pressure in the main frequency band (500 to 2300 Hz) of the sound is about 5 dB lower than that in Example 1 (see FIG. 10A). Thus, it has been confirmed that the vibrator 1 in Example 3 can function effectively as a cartilage conduction vibrator though having lower sound quality than the vibrator 1 in Example 1.

Based on the foregoing multiple tests, in which the thickness of the damper 10 was changed, the thickness of the damper 10 that allows the vibrator 1 to effectively function as a cartilage conduction vibrator is 0.1 to 0.35 mm. The diameter of the damper 10 is 8.0 to 12.0 mm.

Further, based on the multiple tests, in which the weight of the yoke 11 was changed, the weight (mass) of the yoke 11 that allows the vibrator 1 to effectively function as a cartilage conduction vibrator is 0.30 to 1.00 g.

The top plate 7, supporting the first magnet 6 and the second magnet 8 integrally, is also a component that affects the acoustic property of the vibrator 1. The top plate 7 has a weight (mass) of 0.05 to 0.20 g. The top plate 7 has a thickness of 0.3 to 1.0 mm.

In the vibrator 1 that satisfies all the dimension and property of each of the foregoing component, the coil 5 has a magnetic flux density of 300 to 1000 mT. This obtains a driving force to cause the magnet 20 to strongly vibrate, thereby enabling the vibrator 1 to effectively function as a cartilage conduction vibrator.

Notes

The present disclosure is not limited to the foregoing preferred embodiment; various modifications can be devised within the scope of the claims. A preferred embodiment that is obtained in combination as necessary with technical means disclosed in respective preferred embodiments is also included in the technical scope of the present disclosure. Furthermore, combining the technical means disclosed in the respective preferred embodiments can form a new technical feature.

Figure 12:
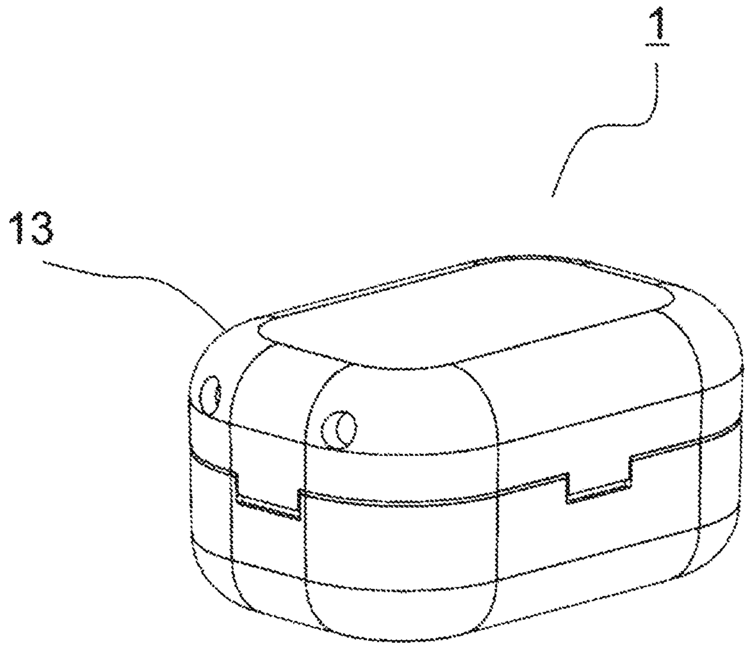
FIG. 12 is a perspective view of the vibrator of a hearing device according to a first modification.
Figure 13:
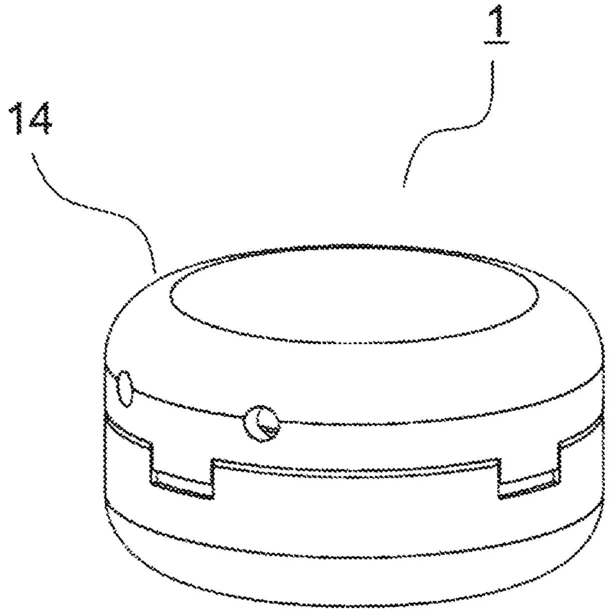
FIG. 13 is a perspective view of the vibrator of a hearing device according to a second modification.

Although the case 2 according to the foregoing preferred embodiment has a spherical shape, or a shape close to a spherical shape, a case having another shape may be used. FIG. 12 is a perspective view of the vibrator 1 of a hearing device according to a first modification. FIG. 13 is a perspective view of the vibrator 1 of a hearing device according to a second modification. Like the vibrator 1 according to the first modification illustrated in FIG. 12, a box-shaped case 13 may be used instead of the case 2 according to the forgoing preferred embodiment. Like the vibrator 1 according to the second modification illustrated in FIG. 13, a cylindrical case 14 may be used instead of the case 2 according to the forgoing preferred embodiment. When a case having another shape is used instead of the case 2 according to the foregoing preferred embodiment, the shapes of the individual components, such as the damper and yoke, need to be changed as appropriate so as to correspond to the case's shape.

Figure 14:
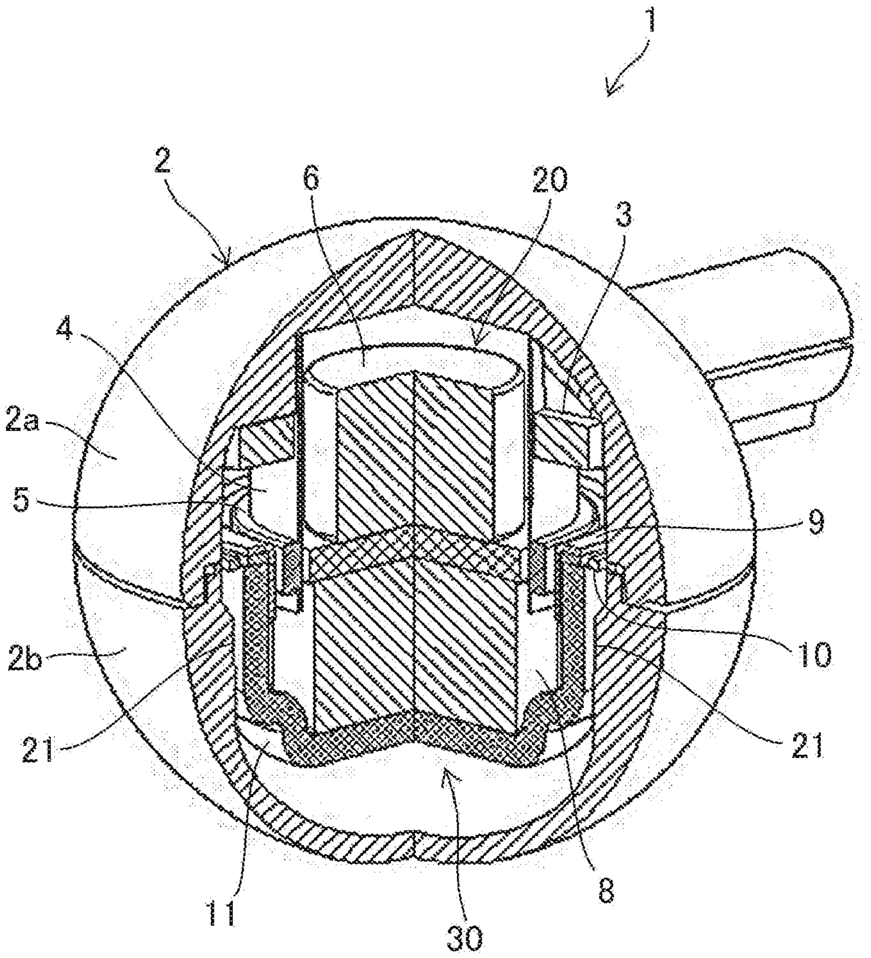
FIG. 14 illustrates the inner structure of the vibrator of a hearing device according to a third modification.

For instance, upon the vibrator 1 receiving an impact from its side surface, the assembly 30 including the yoke 11 vibrates in the direction of the side surface. If the yoke 11 vibrates greatly in this side-surface direction, the damper 10, supporting the yoke 11, can be possibly deformed or damaged. To prevent this, the inner surface of the case 2 surrounding the space may include a facing portion 21 closely facing the yoke 11, as illustrated in FIG. 14. FIG. 14 illustrates the inner structure of the vibrator 1 of a hearing device according to a third modification.

The vibrator 1 according to the third modification is structured such that the inner surface of the case 2 extending in the circumferential direction in the upper part of the lower case **2*b* is the facing portion 21 facing the outer periphery surface of the yoke 11 with an interval therebetween. The facing portion 21 bulges toward the space within the case 2 so that the thickness of the upper part of the lower case 2*b* increases. Accordingly, the gap formed between the case 2 and the yoke 11 is narrower than that in a case where no facing portion 21 is provided. The gap formed between the yoke 11 and the facing portion 21** measures about 0.3 mm for instance.

In the third modification, the facing portion 21 narrows the gap between the case 2 and yoke 11, as described above, thus limiting the movable range of the yoke 11 in the side-surface direction. Even if the vibrator 1 receives an impact from the side surface, the vibration width of the yoke 11 in the side-surface direction is prevented, and hence, the damper 10 is less likely to be deformed or damaged. It is noted that the facing portion 21 may be composed of a single projection or a plurality of projections protruding from the inner surface of the case 2 toward the yoke 11.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A vibrator comprising:

a case having a space inside; and magnets supported in the space and configured to vibrate, wherein the magnets include a first magnet and a second magnet disposed such that respective magnetic poles identical to each other face, a volume of the first magnet is smaller than a volume of the second magnet, and the first magnet and the second magnet are disposed within the space on opposite sides of a center of the case.

2. The vibrator according to claim 1, wherein a volume ratio of the second magnet to the first magnet is greater than 1 and equal to or smaller than 121.

3. The vibrator according to claim 1, wherein a surface magnetic flux ratio of the second magnet to the first magnet is greater than 1 and equal to or smaller than 3.

4. The vibrator according to claim 1, wherein the first magnet is fastened to an upper surface of a top plate composed of a ferromagnet and the second magnet is fastened to a lower surface of the top plate.

5. The vibrator according to claim 1 further comprising:

a yoke being open at an upper end of the yoke and having a bottom surface portion and a circumferential wall portion;

a coil bobbin at least partly disposed inside the yoke;

a coil wound around the coil bobbin;

a damper supporting the yoke; and a frame fastening the damper to the yoke, wherein at least a part of the magnets is disposed inside the coil bobbin, the case houses an assembly on which the yoke, the coil bobbin, the coil, the magnets, the damper, and the frame are mounted, and the assembly vibrates in the space integrally together with the magnets.

6. The vibrator according to claim 5, wherein an inner surface of the case surrounding the space includes a facing portion closely facing the yoke.

7. A hearing device comprising the vibrator according to claim 1 as a cartilage conduction vibrator for transmitting a sound signal to an ear cartilage.

8. The vibrator according to claim 1, wherein an outer diameter of the first magnet is smaller than an outer diameter of the second magnet.

9. The vibrator according to claim 8, wherein a height of the first magnet is smaller than a height of the second magnet.

10. The vibrator according to claim 1, wherein the first magnet and the second magnet each have a columnar shape and are coaxial with each other, and central axes of the first magnet and the second magnet pass through the center of the case.

* * * * *